(12) United States Patent
Priess et al.

(10) Patent No.: US 10,557,511 B2
(45) Date of Patent: Feb. 11, 2020

(54) AIR SPRING UNIT

(71) Applicants: Thyssenkrupp Bilstein GmbH, Ennepetal (DE); thyssenkrupp AG, Essen (DE); Dunlop Systems and Components, Exhall Coventry (GB)

(72) Inventors: Jens Priess, Oberhausen (DE); Thomas Kampschulte, Lennestadt (DE); Kyle Cooper, Lutterworth (GB); Christopher Ross, Bedworth (GB)

(73) Assignees: Thyssenkrupp Bilstein GmbH, Ennepetal (DE); thyssenkrupp AG, Essen (DE); Dunlop Systems and Components, Exhall Coventry (GB)

( * ) Notice: Subject to any disclaimer, the term of this patent is extended or adjusted under 35 U.S.C. 154(b) by 0 days.

(21) Appl. No.: 15/773,756

(22) PCT Filed: Nov. 14, 2016

(86) PCT No.: PCT/EP2016/077585
§ 371 (c)(1),
(2) Date: May 4, 2018

(87) PCT Pub. No.: WO2017/081319
PCT Pub. Date: May 18, 2017

(65) Prior Publication Data
US 2018/0320748 A1      Nov. 8, 2018

(30) Foreign Application Priority Data

Nov. 12, 2015   (DE) .................. 10 2015 119 579

(51) Int. Cl.
*F16F 5/00*   (2006.01)
*F16F 9/04*   (2006.01)
*F16F 9/05*   (2006.01)

(52) U.S. Cl.
CPC ............ *F16F 9/0454* (2013.01); *F16F 9/057* (2013.01); *F16F 2230/32* (2013.01)

(58) Field of Classification Search
CPC .......... F16F 9/04; F16F 9/0445; F16F 9/0454; F16F 9/0463; F16F 9/057; B60G 15/12; B60G 11/27
(Continued)

(56) References Cited

U.S. PATENT DOCUMENTS 6,123,325 A * 9/2000 Buchanan ............. F16F 9/0454
                                                              267/122
6,234,460 B1 * 5/2001 Arnold ................... B60G 11/28
                                                              267/122
(Continued)

FOREIGN PATENT DOCUMENTS

DE        2023105 A1    12/1971
JP      2010281433 A    12/2010
(Continued)

OTHER PUBLICATIONS

International Search Report (in English and German) and Written Opinion issued in PCT/EP2016/077585, dated Jan. 25, 2017, 12 pages.
(Continued)

*Primary Examiner* — Christopher P Schwartz
(74) *Attorney, Agent, or Firm* — Hamre, Schumann, Mueller & Larson, P.C.

(57) ABSTRACT

The invention relates to an air spring (1) for a vehicle, comprising
an air-spring module (2) having an air-spring module connection element (3) as connecting part with the load to be suspended, and air-spring module bellows (4), wherein the air-spring module bellows (4) are connected, on the side facing the air-spring module con-
(Continued)

nection element (3), to the air-spring module connection element (3) at least in an airtight manner, a rolling piston (8), wherein the air-spring module (2) has at least one connecting element (5) for at least airtight connection of the air-spring module (2) to the rolling piston (8), wherein the air-spring module bellows (4) are arranged in an airtight connecting manner between the air-spring module connection element (3) and the connecting element (5), wherein the connecting element (5) is arranged directly adjacent to the rolling piston (8) at least in certain sections and the connecting element (5) is placed onto the rolling piston (8), and wherein one or more guide rib(s) (7) is/are arranged on the connecting element (5), which form an effective connection to the air-spring-module-side rolling piston end and stabilize the air-spring module (2) in the transverse direction to the longitudinal axis (L) of the rolling piston (8).

20 Claims, 4 Drawing Sheets

(58) Field of Classification Search
USPC .............................. 267/64.19–64.27, 120–124
See application file for complete search history.

(56) References Cited

U.S. PATENT DOCUMENTS

| | | | | |
|---|---|---|---|---|
| 7,404,547 | B2* | 7/2008 | Taylor | F16F 9/0463 267/64.24 |
| 9,587,700 | B2* | 3/2017 | Stahmer | F16F 9/057 |
| 2002/0153646 | A1* | 10/2002 | Weitzenhof | F16F 9/0463 267/64.27 |
| 2004/0026837 | A1 | 2/2004 | Ferrer | |
| 2010/0001446 | A1* | 1/2010 | Oldenettel | F16F 9/0445 267/122 |
| 2011/0169203 | A1* | 7/2011 | Watanabe | F16F 9/0454 267/122 |
| 2013/0147099 | A1* | 6/2013 | Eike | B60G 15/14 267/64.27 |
| 2014/0061984 | A1 | 3/2014 | Hart et al. | |

FOREIGN PATENT DOCUMENTS

| | | |
|---|---|---|
| WO | 2012107283 A1 | 8/2012 |
| WO | 2014023461 A1 | 2/2014 |
| WO | 2014093605 A1 | 6/2014 |

OTHER PUBLICATIONS

Office Action issued in DE10 2015 119 579.8, dated Jul. 14, 2016, 7 pages.

* cited by examiner

AIR SPRING UNIT

The present invention relates to an air spring for a vehicle, an air-spring module for an air spring, a method for producing an air spring and a method for producing an air-spring module.

PRIOR ART

Air springs are known in the prior art in a multiplicity of embodiments. Air springs used for air suspension are based on a suspension system, which makes use of the compressibility of gases, particularly atmospheric air, and is also known as volume suspension. In volume suspension, the spring action is based on volumes and therefore on the pressure change of the resilient medium, such as air in the case of an air suspension. The resilient medium is enclosed by a container, particularly bellows, wherein the gas is compressed by means of driving-dynamic forces acting from outside, such as compression of a wheel for example, whereby a change in volume results. Thus, the air suspension takes place in particular by means of bellows, in which compressed air forms the counterpart force to the driving-dynamic forces on the respective wheel or the axle, in the case of fluctuating pressure. Furthermore, the vehicle height can also be set in a variable manner by means of air suspension and the pressure in the springs can also be regulated for example by means of ride-height control valves in such a manner that the car height remains constant independently of the load. In the case of air shortages, the vehicle body drops onto built-in mechanical emergency springs. Replacing air springs is material-intensive and time-consuming. Furthermore, the rolling pistons are for the most part machined and adapted in a complicated manner, particularly with a crimp contour. In addition, setting the spring characteristic, such as the spring rate for example, of conventional air springs is very expensive or can only be changed subsequently in a very time- and cost-intensive manner. In addition, individual components of an air spring can only be replaced in a very cost- and time-consuming manner. Furthermore, air suspensions known in the prior art are unstable with respect to transverse forces and often reliant on stabilizers for supporting the body during cornering and therefore an increase of the body roll spring rate.

An air spring with bellows and a rolling piston are known from WO 2012/107 283 A1, wherein the bellows are connected to the rolling piston directly. The bellows can be fastened on the rolling piston using a clamping ring.

The present invention is therefore based on the object of providing an improved air spring and/or an air-spring module for vehicles and an improved method for producing an air spring and/or an air-spring module, in which the previously mentioned disadvantages are prevented. In particular, a simple, fast, variable and variant-rich connection of different rolling pistons, particularly rolling pistons with different outer contours and therefore the setting/provision of different spring characteristics, such as spring rates of the air spring for example, should be enabled using this improved air spring and/or the air-spring module. In addition, the use of rolling pistons with a lower degree of finishing, particularly with an omitted crimp contour, should be enabled. Furthermore, an easy, faster and reliable attachment of air-spring modules on rolling pistons should be ensured with this air-spring module. In addition, a production process which is more stable, less prone to damage, simplified and richer in terms of variants, should be provided using the improved method for producing an air spring and/or an air-spring module.

DISCLOSURE OF THE INVENTION

This object is achieved with an air spring according to claim 1, an air-spring module according to claim 7, a method for producing an air spring according to claim 8 and a method for producing an air-spring module according to claim 9.

The air spring according to the invention for a vehicle has the advantage compared to conventional air springs that the air-spring module is connected to the rolling piston in a detachable manner and therefore (a) short-term combination(s) of the air-spring module with a selection of different rolling pistons, having different effective rolling-piston surfaces, is possible. As a result, many spring-rate variation options are possible short-term. In addition, a flexible modular construction system can be realized and, with a multiplicity of combination possibilities with one or more air-spring module(s) with the rolling pistons, innumerable variants of air springs can be provided. Furthermore, a modular replacement of individual components in the air spring is possible quickly and easily. In addition, a standardization of individual components, such as for example the air-spring module, can be realized.

Compared to conventional air springs, the air-spring module according to the invention for a vehicle has the advantage that using the air-spring module according to the invention, a flexible modular construction system is realized, and a multiplicity of combination options with one or more air-spring module(s) and the rolling pistons, and innumerable air spring variants are provided.

The method according to the invention for producing an air-spring module and/or an air spring has the advantage compared to methods for producing conventional air springs, that due to the short-term combination option of air-spring modules with rolling pistons and the standardization option of individual modules, the method is designed to be more variable, more flexible and, if appropriate, more uniform compared to the prior art, and is enabled in the first place. Thus, using the methods according to the invention, a modular construction system with a multiplicity of combination and variation options can be illustrated.

Therefore, the subject matter of the invention is an air spring for a vehicle, comprising an air-spring module having an air-spring module connection element as connecting part with the load to be suspended, particularly a vehicle body or an axle of the vehicle and air-spring module bellows, wherein the air-spring module bellows are connected, on the side facing the air-spring module connection element, to the air-spring module connection element at least in an airtight manner, a rolling piston, wherein the air-spring module has at least one connecting element for at least airtight connection of the air-spring module to the rolling piston, wherein the air-spring module bellows are arranged connecting the air-spring module connection element to the connecting element at least in an airtight manner, and the connecting element is arranged in direct adjacent contact with the rolling piston at least in certain sections and the connecting element is placed onto the rolling piston.

A further subject matter of the invention is an air-spring module for an air spring for a vehicle, comprising an air-spring module connection element as a connecting part with the load to be suspended, particularly a vehicle body or an axle of the vehicle, and an air-spring module bellows, wherein the air-spring module bellows are connected, on the side facing the air-spring module connection element, to the air-spring module connection element at least in an airtight manner, wherein the air-spring module has at least one connecting element for at least airtight connection of the air-spring module to a rolling piston, wherein the air-spring module bellows is arranged connecting the air-spring module connection element to the connecting element at least in an airtight manner.

A further subject matter of the invention is a method for producing an air spring (1) for a vehicle, comprising the following steps:

a) providing an air-spring module comprising an air-spring module connection element as connecting part with the load to be suspended, particularly a vehicle body or an axle of the vehicle and air-spring module bellows, wherein the air-spring module bellows are connected, on the side facing the air-spring module connection element, to the air-spring module connection element at least in an airtight manner;

b) providing a rolling piston;

c) connecting the air-spring module provided in step a) to the rolling piston provided in step b) and forming an at least airtight connection, wherein the air-spring module provided in step a) has a connecting element, wherein the connecting element is arranged on the air-spring module bellows on the side facing the rolling piston and the method in step c) is carried out by means of a connecting element directly adjacent to the air-spring-module-side rolling piston end at least in certain sections.

A further subject matter of the invention is a method for producing an air-spring module for a vehicle, comprising the provision of an air-spring module comprising an air-spring module connection element as connecting part with the load to be suspended, particularly a vehicle body or an axle of the vehicle and air-spring module bellows, wherein the air-spring module bellows are connected, on the side facing the air-spring module connection element, to the air-spring module connection element at least in an airtight manner;

wherein the provided air-spring module has a connecting element, wherein the connecting element is arranged on the air-spring module bellows on the side facing away from the air-spring module connection element and an at least airtight connection is produced between the air-spring module bellows and the connecting element.

A further subject matter of the invention is the use of an air-spring module and/or an air spring for a vehicle, particularly for a vibration damper, ride-height controller and combinations thereof, comprising an air-spring module having an air-spring module connection element as connecting part with the load to be suspended, particularly a vehicle body or an axle of the vehicle and air-spring module bellows, wherein the air-spring module bellows are connected, on the side facing the air-spring module connection element, to the air-spring module connection element at least in an airtight manner, a rolling piston, wherein the air-spring module has at least one connecting element for at least airtight connection of the air-spring module to the rolling piston, wherein the air-spring module bellows are arranged on the side facing the rolling piston on the connecting element, and the connecting element is arranged directly adjacent to the rolling piston at least in certain sections and the connecting element is placed onto the rolling piston.

The invention can be realized both in the air spring for a vehicle and in an air-spring module for an air spring.

DETAILED DESCRIPTION OF THE INVENTION

In the context of the present invention, an air-spring module connection element is understood to be an element which at least effectively connects the air-spring module to the load to be suspended, particularly a vehicle body or an axle of the vehicle. For example, an air-spring module connection element has holes and/or eyelets, by means of which the air-spring module connection element is connected using plug and/or screw connections to the vehicle body or an axle of the vehicle.

In a preferred embodiment of the invention, a support bearing is arranged on the air-spring module connection element, which support bearing at least effectively connects the air-spring module to the load to be suspended, particularly a vehicle body or an axle of the vehicle.

In the context of the present invention, at least airtight is understood to mean tightness at least for an earth-atmosphere gas mixture. For example, an earth-atmosphere dry gas mixture comprises an air composition of around 78% by volume nitrogen, around 21% by volume oxygen and around 1% by volume noble gas(es). In addition, small portions of carbon dioxide and traces of other gases may also be included. Furthermore, the earth-atmosphere gas mixture may, in the case of humid air composition, also comprise portions of water, particularly in a gaseous aggregate state as steam. If liquid portions, particularly of water, are included in the earth-atmosphere gas mixture, then at least airtight includes fluid tightness.

In the context of the present invention, a rolling piston is understood to mean a piston with an outer contour on which the air-spring module bellows can roll during spring, particularly compression processes. The geometry of the outer contour has a direct influence on the setting of the spring characteristic, such as the spring rate for example. For example, a piston may be selected as a hollow piston, a rod, a tube, particularly a damper tube, and combinations thereof. On the side of the rolling piston facing away from the air-spring module bellows, the rolling piston is, in the installed state of the air spring, effectively connected to the load to be suspended, particularly a vehicle body or an axle of the vehicle.

In the context of the present invention, placed onto is in particular understood to mean plugged into, reaches into, protrudes into, plugged onto, placed onto, encloses, embraces, spans, clamps, and combinations thereof.

In the context of the present invention, directly adjacent also includes a direct contact of individual elements, particularly the direct contact of a connecting element with the rolling piston.

In the context of the present invention, a vibration damper is understood to mean systems for damping mechanical oscillations, such as for example vibrations, shocks, impacts and combinations thereof. In particular, in the case of vibration dampers loaded with a mechanical vibration, kinetic energy, particularly vibration energy, is converted into heat energy. In the field of automotive engineering, vibration dampers are used in travelling gears of motor vehicles in particular and are usually termed (vehicle) shock absorbers. These (vehicle) shock absorbers operate in a frequency-independent manner and require a "static" counterpart, such as for example a body and are also termed friction brakes in particular.

In a further embodiment of the invention, the direct adjacent arrangement of the connecting element placed onto the rolling piston is a detachable connection. In particular, the detachable connection is an at least positive connection. For example, the detachable connection is selected from a group of a plug connection, a clamping connection, a screw connection, a latching connection, particularly a snap connection, a bayonet connection and combinations thereof.

In a further embodiment of the invention, the connecting element engages into the air-spring-module-side rolling piston end, in particular protrudes into the air-spring-module-side rolling piston end.

In a further embodiment of the invention, the connecting element is plugged onto the air-spring-module-side rolling piston end, in particular at least partially encloses the rolling piston end.

In a further embodiment of the invention, the connecting element is fixed in a detachable manner on the rolling piston using at least one fixing element, wherein the at least one fixing element has an effective direction deviating from the longitudinal axis of the rolling piston.

In a further embodiment of the invention, at least one sealing element is arranged in the region between the connecting element directly adjacent to the air-spring-module-side rolling piston end at least in certain sections and the air-spring-module-side rolling piston end. The sealing element produces an at least airtight connection between the air-spring-module-side rolling piston end and the connecting element and is selected from static seals known in the prior art in particular, the sealing elements of which are not exposed to any relative movements, as for example for sealing a rotating shaft with respect to a static housing. Seals according to the invention are for example selected from the group of flat seals, profile seals, sleeve seals, sealing compounds, sealing rings, particularly O-rings, rubber sealing rings, caoutchouc sealing rings, polymer sealing rings and combinations thereof.

In a further embodiment of the invention, the at least one sealing element is arranged at the connecting element and/or the air-spring-module-side rolling piston end.

In a further embodiment of the invention, one or more guide rib(s) is/are arranged on the connecting element, which form an effective connection to the air-spring-module-side rolling piston end and stabilize the rolling piston in the transverse direction to the longitudinal axis of the air-spring module, particularly in the case of the arrangement of a damper tube on the rolling piston. Alternative or further stabilization options are for example cap(s), sleeve(s) and/or ring(s) arranged on the rolling piston, and combinations thereof. The stabilization options stabilize the rolling piston, particularly a damper tube arranged on the rolling piston, against bending away in the case of transverse forces which are introduced.

Preferably, the connecting element has a rotationally symmetrical, particularly annular wall. The guide ribs are arranged on the circumference of the wall. The guide ribs extend radially inwards starting from the wall. As a result, a compact connecting element is created, which is suitable for the modular construction and can be combined with various shapes of rolling piston. The inwards radial extent of the guide ribs makes optimum use of the available installation space in the interior of the connecting element, so that the stiffness of the overall system is significantly improved, without the external diameter being enlarged in the process.

In a further preferred embodiment, the guide ribs are arranged oppositely in pairs. The absorption and dissipation of transverse forces benefits as a result.

The connecting element can have 4 to 12 guide ribs, particularly 6 to 10 guide ribs. The number of guide ribs depends on the dimensions of the connecting element or the rolling piston and the load situations, for which the rolling piston or the connecting element are designed.

In a further preferred embodiment, the guide ribs are arranged, at least in certain sections, preferably essentially completely in the mounted state, in the rolling piston. In other words, the wall of the connecting element, on which the guide ribs are fastened, is arranged in the rolling piston. Specifically, in this case the rolling piston can have an accommodating section, particularly a cylindrical accommodating section, which accommodates the connecting element in the mounted state. The guide ribs are approximately arranged at the height of the accommodating section of the rolling piston. As a result, it is achieved that the transverse forces in the region of the connection between the rolling piston and the connecting element are reliably accommodated.

Preferably, the connecting element is non-positively connected or pressed together with the accommodating section. Actually, the holding force is generated by the seal or the seals between the connecting element and the accommodating section. The connecting element is plugged during mounting. There is a clearance fit between the connecting element and the accommodating section. This reduces the joining forces considerably. The spring forces generated during the operation of the air spring effectively prevent the connecting element from being pulled out.

Therefore, the connecting element can have a seal on the outer circumference, which, in the mounted state, bears against the inner diameter of the accommodating section.

In a particularly preferred embodiment, the guide ribs axially protrude beyond the end of the connecting element, particularly the wall, arranged in the rolling piston in the mounted state. The axially protruding section of the guide ribs is used as an insertion aid during the mounting of the connecting element. The guide ribs guide the connecting element when the connecting element is fitted into the rolling piston, particularly the accommodating section of the rolling piston.

In this case, the guide ribs may be curved, particularly concavely curved, on the radially outer side (outer edge). As a result, tilting when inserting the connecting element can be reliably prevented. Actually, the part of the guide ribs protruding beyond the wall in the axial direction is constructed in a curved manner.

On the radially inner side (inner edge), the guide ribs can be constructed with a straight edge. The straight edges or the straight inner edges of the guide ribs are used as a contact surface for a damping tube arranged concentrically in the rolling piston. Thus, a particularly good stabilization is achieved when introducing transverse forces.

In a further embodiment of the invention, the connecting element and the air-spring module connection element are arranged opposite one another on an effective axis, wherein the effective axis also comprises a parallel axis to the longitudinal axis of the rolling piston.

In a further embodiment of the invention, the air-spring module has at least one outer guide element, wherein the outer guide element at least partially encompasses the air-spring module bellows.

In a further embodiment of the invention, the air-spring module bellows are arranged on the connecting element on the side facing away from the air-spring module connection element. Here also, it applies analogously that the guide ribs interact in connection with a damper tube and/or a damper cap a in the rolling piston, so that a dissipation of the forces onto the damper tube and/or the damper cap is enabled.

In a further embodiment of the invention, with the connection in step c), the connecting element engages into the air-spring-module-side rolling piston end, in particular the connecting element is plugged into the air-spring-module-side rolling piston end.

In a further embodiment of the invention, with the connection in step c), the connecting element (5) is plugged onto the air-spring-module-side rolling piston end, and in particular encloses the rolling piston end at least to some extent.

BRIEF DESCRIPTION OF THE DRAWINGS

The air-spring module according to the invention of an air spring according to the invention for a vehicle is explained on the basis of the drawings.

Figure 1:
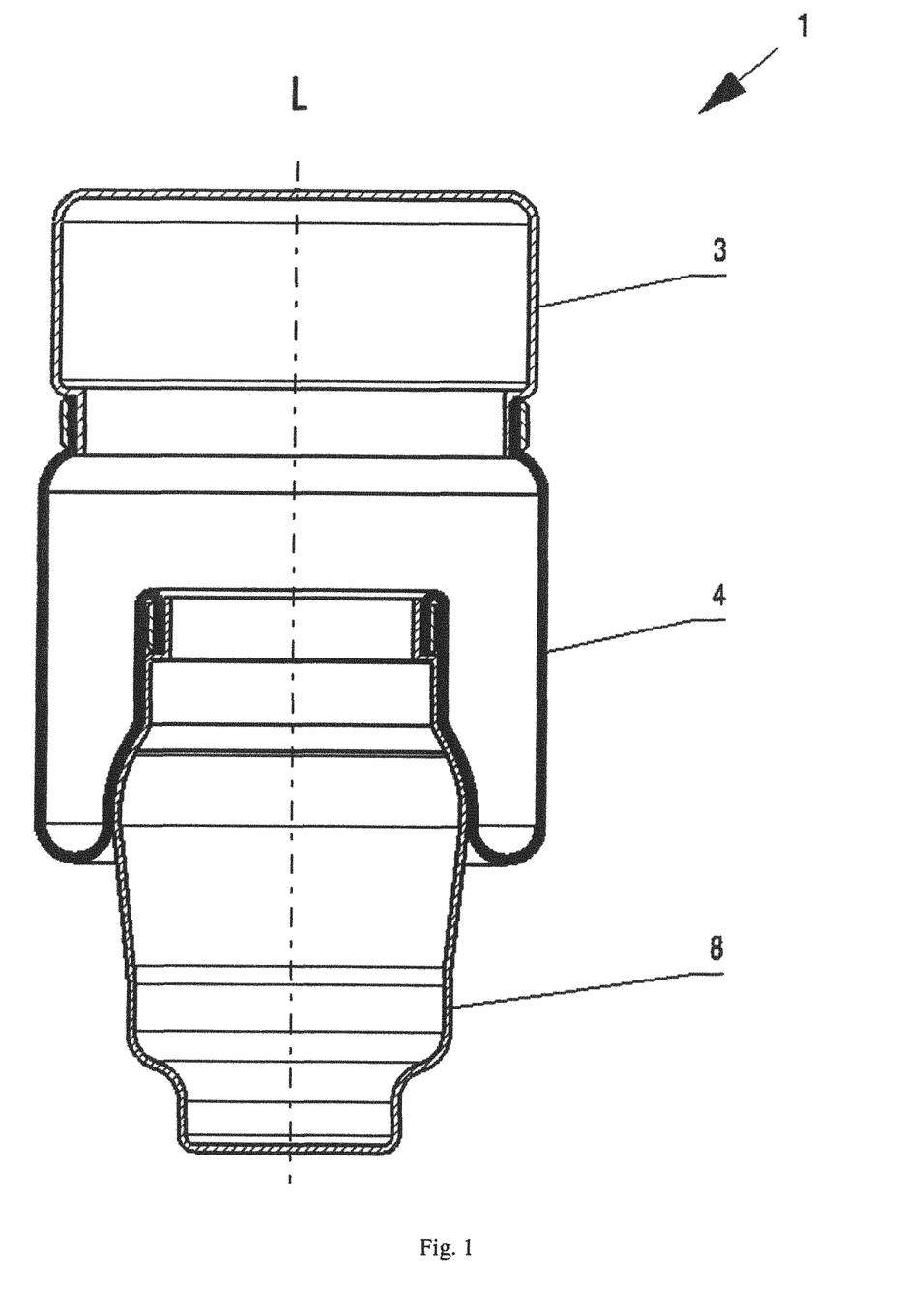
FIG. 1 schematically shows a longitudinal section of an air spring according to the prior art, FIG. 2 schematically shows a longitudinal section of an air-spring module and rolling piston according to an embodiment of the invention, which can be plugged to form an air spring, FIG. 3 schematically shows a longitudinal section of an air-spring module and rolling piston according to an embodiment of the invention, which can be plugged to form an air spring, FIG. 4 schematically shows a longitudinal section of an air-spring module, which can be plugged to form an air spring, with sealing elements, an outer guide element and a rolling piston according to an embodiment of the invention.

In FIG. 1, a longitudinal section is illustrated of an air spring 1, comprising an air-spring module connection element 3 for connection to a load to be suspended, particularly a vehicle body or an axle of the vehicle, air-spring module bellows 4 and a rolling piston 8 according to the invention. The air-spring module bellows 4 are connected to the rolling piston 8 on the side facing away from the air-spring module connection element 3 in direct contact with the rolling piston 8 and in particular by means of a pipe clamp.

Figure 2:
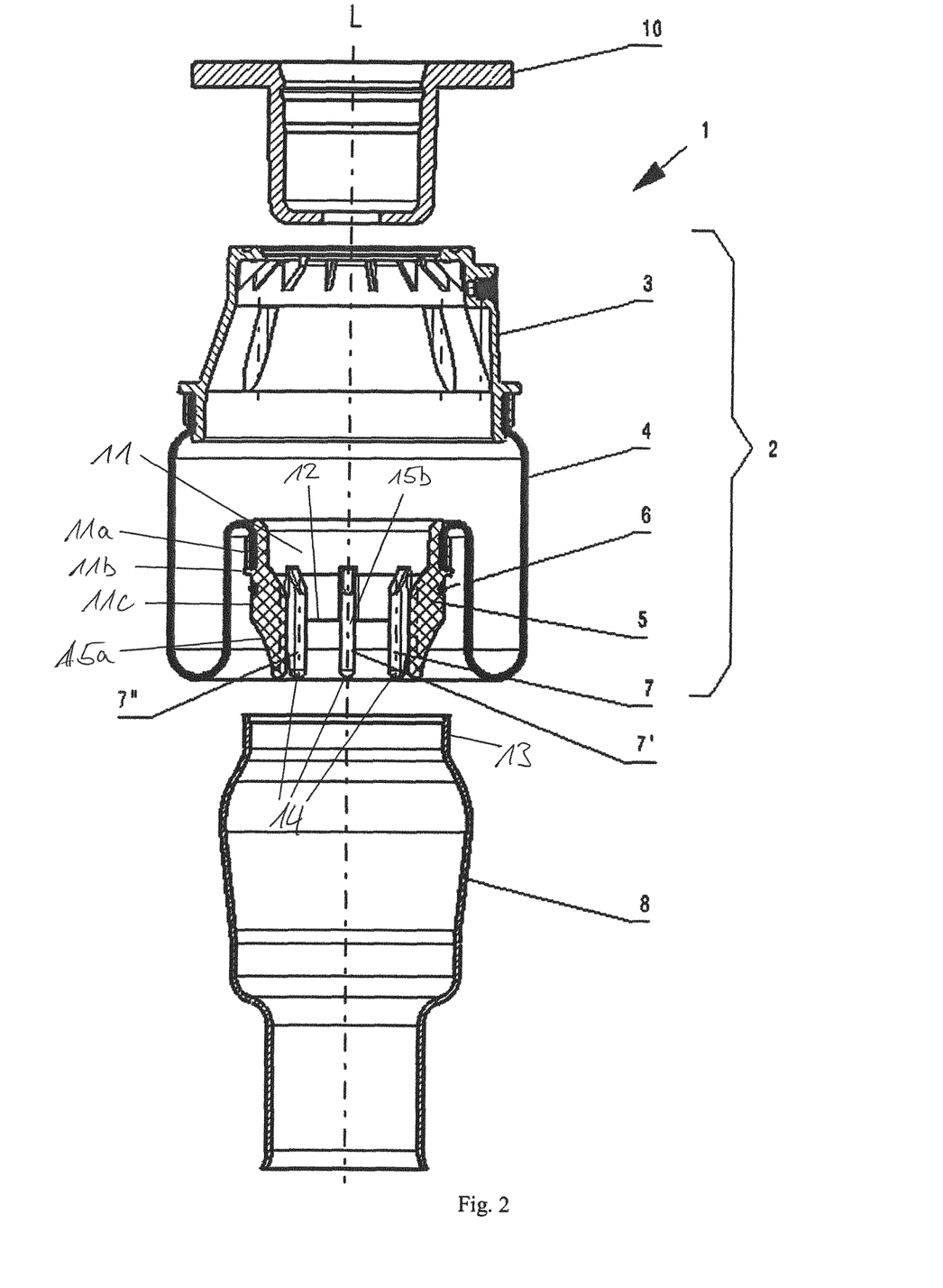

A longitudinal section of an unmounted air spring 1 according to the invention, comprising an air-spring module 2 and the rolling piston 8, is illustrated in FIG. 2. The air-spring module 2 comprises the air-spring module connection element 3, the air-spring module bellows 4 and a connecting element 5. A support bearing 10 is arranged on the air-spring module connection element 3 for connecting the air-spring module 2 to the load to be suspended, particularly the vehicle body or an axle of the vehicle. The air-spring module bellows 4 are arranged in an airtight manner between the air-spring module connection element 3 and the connecting element 5. On the side facing away from the air-spring module bellows 4, the air-spring module connection element 3 can be arranged on the load to be suspended. The connecting element 5 of the air-spring module 2 can be connected in an at least airtight but detachable manner to the rolling piston 8, for example by means of a plug connection, as illustrated, for producing an air spring 1. The rolling piston 8 has an outer contour. To ensure an at least airtight connection, a sealing element 6 is arranged on the connecting element 5. In addition, for additional support against transverse forces, a plurality of guide ribs 7, 7', 7" are arranged on the connecting element 5.

Figure 4:
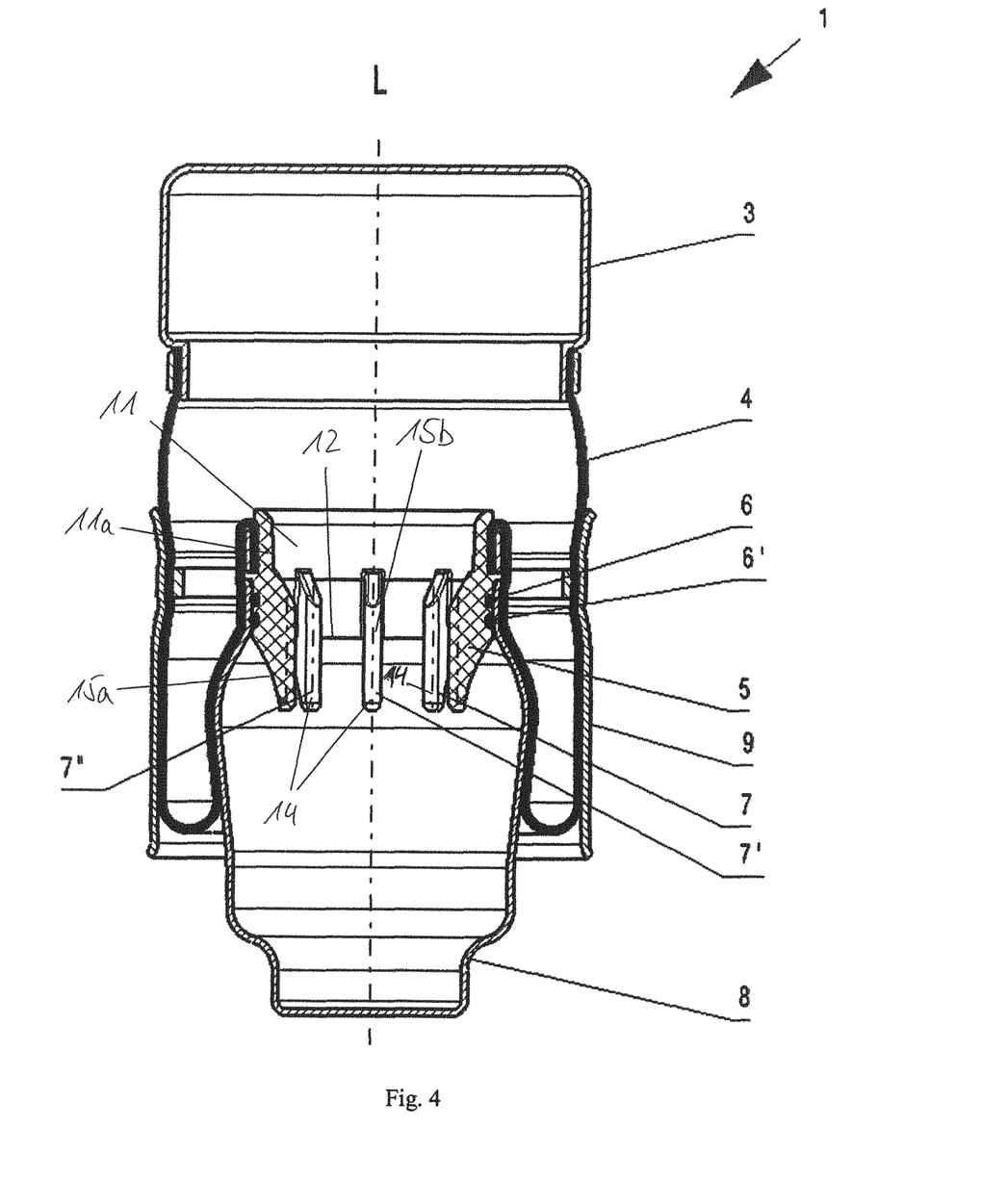

As can be seen well in FIGS. 2 and 4, the guide ribs 7, 7', 7" are arranged in a distributed manner on the circumference of the connecting element 5, specifically such that the guide ribs 7, 7', 7" are arranged oppositely in pairs. In this case, the guide ribs 7, 7', 7" extend radially inwards. The connecting element 5 has a wall 11 which is of annular construction. The wall 11 comprises a first annular section 11a and a second annular section 11c. The first annular section 11a is connected to the air-spring module bellows 4. The guide ribs 7, 7', 7" are fastened on the second annular section 11c. Between the first and second annular sections 11a, 11c, a circumferential collar 11b is constructed on the outer circumference of the wall 11, which in the mounted state forms a stop, against which the rolling piston 8 bears (FIG. 4).

The wall 11, actually the second annular section 11c, forms a lower edge 12, beyond which the guide ribs 7, 7', 7" protrude in the axial direction. The axially protruding sections 14 of the guide ribs 7, 7', 7" form an insertion aid, which facilitates the mounting of the connecting element 5 and the rolling piston 8. To this end, the outer edges 15a of the guide ribs 7, 7', 7" are constructed in a curved, particularly concavely curved manner. The inner edges 15b are constructed in a straight manner.

In the mounted state, the second annular section 11c is introduced into a cylindrical accommodating section 13 of the rolling piston 8, so that the upper edge of the accommodating section 13 bears against the collar 11b of the connecting element 5. The accommodating section 13 and the second annular section 11c of the connecting element 5 are non-positively connected, particularly pressed together. As can be seen well in FIG. 4, the guide ribs 7, 7', 7", actually the part of the guide ribs 7, 7', 7" fastened on the second annular section 11c, are arranged at the height of the accommodating section 13, so that transverse forces which arise can be dissipated well.

The axially protruding sections 14 of the guide ribs 7, 7', 7" have the further advantage that the same enlarge the force-dissipating surface for the transverse forces radially inwards onto a damper tube (not shown) or a damper cap. In this case, the damper tube bears against the inner edges 15b.

8 guide ribs 7, 7', 7" are provided in the exemplary embodiments according to FIGS. 2 and 4. A different number, for example 6 or 10 guide ribs 7, 7', 7", is possible.

In a completely mounted air spring 1, the air-spring module 2 connected to the rolling piston 8 is arranged on a longitudinal axis L, and during a compression process, the air-spring module bellows 4 arranged on the connecting element 5 roll at least to some extent on the outer contour of the rolling piston 8, wherein the air located in the air-spring module bellows 4 is compressed. The spring rate of the air spring 1 can for example be set by means of the outer contour of the rolling piston 8.

Figure 3:
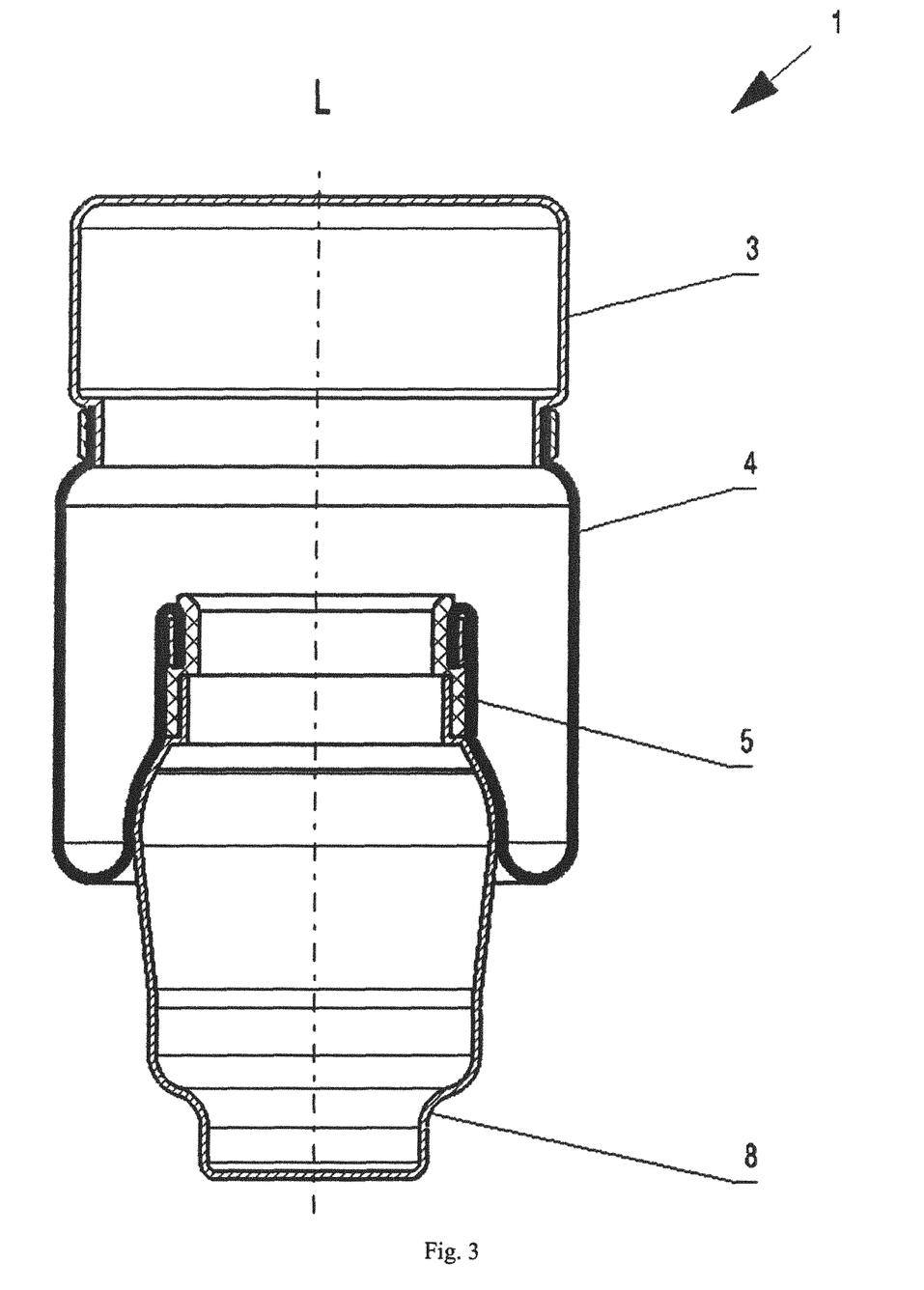

In FIG. 3, a longitudinal section is illustrated of the air-spring module, plugged onto the rolling piston 8 to form the air spring 1, forming a closed air spring 1 according to an embodiment of the invention.

In FIG. 4, a longitudinal section is illustrated of the air-spring module, plugged into the rolling piston 8 to form the air spring 1, forming a closed air spring 1 according to an embodiment of the invention. Two sealing elements 6, 6' for an at least airtight connection between the connecting element 5 and the rolling piston 8 are arranged on the connecting element 5. In addition, the air-spring module bellows 4 are encompassed, at least in the region between the opposite air-spring module connection element 3 and the connecting element 5, with an outer guide element 9, whereby the air-spring module bellows 4 can be adapted to structural environmental conditions.

INDUSTRIAL APPLICABILITY

Air springs for a vehicle and air-spring modules for air springs and also a method for producing an air spring of the previously described type are used in the production of vehicles, particularly of travelling gears of motor vehicles.

REFERENCE LIST

1=Air spring
2=Air-spring module
3=Air-spring module connection element
4=Air-spring module bellows
5, 5', 5"=Connecting element(s)
6, 6'=Sealing element(s)
7, 7', 7"=Guide rib(s)
8=Rolling piston
9=Outer guide element
9=Support bearing
11 Wall
11a First annular section
11b Collar
11c Second annular section
12 Lower edge
13 Accommodating section
14 Protruding sections of the guide ribs
15a Outer edge
15b Inner edge
L=Longitudinal axis

The invention claimed is:

1. An air spring for a vehicle, comprising
an air-spring module having an air-spring module connector configured to connect to a load to be suspended, and an air-spring module bellows, wherein the air-spring module bellows are connected to the air-spring module connector in an airtight manner on a side of the air-spring module bellows facing the air-spring module connector, and
a rolling piston,
wherein:
the air-spring module has at least one connecting element configured to provide an airtight connection of the air-spring module to the rolling piston, wherein the air-spring module bellows are arranged in an airtight connecting manner between the air-spring module connector and the connecting element,
the connecting element is arranged directly adjacent to the rolling piston at least in certain sections when the connecting element is placed onto the rolling piston, and
one or more guide rib(s) is/are arranged on the connecting element, the one or more guide rib(s) are configured to provide a connection to an air-spring-module-side end of the rolling piston and stabilize the air-spring module in a transverse direction to a longitudinal axis of the rolling piston.

2. The air spring according to claim 1, wherein the connecting element is detachably connected to the rolling piston.

3. The air spring according to claim 1 wherein the connecting element engages the air-spring-module-side end of the rolling piston, and protrudes into the air-spring-module-side end of the rolling piston.

4. The air spring according to claim 1 wherein the connecting element is plugged onto the air-spring-module-side end of the rolling piston, and encloses an end of the rolling piston.

5. The air spring according to claim 1 wherein at least one sealing element is arranged in a region between the connecting element and the air-spring-module-side end of the rolling piston.

6. The air spring according to claim 1 wherein the air-spring module has at least one outer guide element, wherein the outer guide element at least partially encompasses the air-spring module bellows.

7. The air spring for a vehicle according to claim 1, wherein the one or more guide ribs are each located on an inner surface of the connecting element, and each of the one or more guide ribs extend inwardly from the inner surface of the connecting element.

8. The air spring for a vehicle according to claim 7, wherein the one or more guide ribs each include a protrusion extending in an axial direction beyond an edge of the inner surface of the connecting element.

9. An air-spring module for an air spring for a vehicle, comprising
an air-spring module connector configured to connect to a load to be suspended, and
air-spring module bellows, wherein the air-spring module bellows are connected to the air spring module connector in an airtight manner on a side of the air-spring module bellows facing the air-spring module connector,
wherein the air-spring module has at least one connecting element configured to provide an airtight connection of the air-spring module to a rolling piston, the air-spring module bellows provide an airtight connection between the air-spring module connector and the connecting element, and a plurality of guide ribs are arranged on the connecting element.

10. The air-spring module for an air spring for a vehicle according to claim 9, wherein the plurality of guide ribs are distributed on a circumference of an inner surface of the connecting element, and each of the plurality of guide ribs extend inwardly from the inner surface of the connecting element.

11. The air-spring module for an air spring for a vehicle according to claim 10, wherein each of the plurality of guide ribs include a protrusion extending in an axial direction beyond an edge of the inner surface of the connecting element.

12. A method for producing an air spring for a vehicle, comprising:
a) providing an air-spring module comprising:
an air-spring module connector configured to connect to a load to be suspended, wherein the load to be suspended is one of a vehicle body or an axle of the vehicle, and
air-spring module bellows, wherein the air-spring module bellows are connected to the air-spring module connector in an airtight manner on a side of the air-spring module bellows facing the air-spring module connector;
b) providing a rolling piston;
c) connecting the air-spring module to the rolling piston and forming an airtight connection between the air-spring module and the rolling piston, wherein:
the air-spring module has a connecting element, wherein the connecting element is arranged on the air-spring module bellows on a side facing the rolling piston, the connecting element includes a plurality of guide ribs, and
connecting the air-spring module to the rolling piston is carried out by engaging the connecting element with an air-spring-module-side end of the rolling piston.

13. The method according to claim 12, wherein the plurality of guide ribs are distributed on a circumference of an inner surface of the connecting element, and each of the plurality of guide ribs extend inwardly from the inner surface of the connecting element.

14. The method according to claim 13, wherein each of the plurality of guide ribs include a protrusion extending in an axial direction beyond an edge of the inner surface of the connecting element.

15. A method for producing an air-spring module for a vehicle, comprising:
providing an air-spring module comprising:
an air-spring module connector configured to be connected to a load to be suspended, and
air-spring module bellows, wherein the air-spring module bellows are connected to the air-spring module connector in an airtight manner on a side of the air-spring module bellows facing the air-spring module connector,
wherein
the provided air-spring module has a connecting element, wherein a plurality of guide ribs are arranged on the connecting element and the connecting element is arranged on the air-spring module bellows on a side facing away from the air-spring module connector and an airtight connection is produced between the air-spring module bellows and the connecting element.

16. The method according to claim 15, wherein the plurality of guide ribs are distributed on a circumference of an inner surface of the connecting element, and each of the plurality of guide ribs extend inwardly from the inner surface of the connecting element.

17. The method according to claim 16, wherein each of the plurality of guide ribs include a protrusion extending in an axial direction beyond an edge of the inner surface of the connecting element.

18. An air spring for a vehicle, comprising:
an air-spring module comprising:
an air-spring module connector configured to connect to a load to be suspended, wherein the load to be suspended is one of a vehicle body or an axle of the vehicle, and
air-spring module bellows, and the air-spring module bellows are connected to the air-spring module connector in an airtight manner on a side of the air-spring module bellows facing the air-spring module connector, and
a rolling piston,
wherein
the air-spring module has at least one connecting element configured to provide an airtight connection of the air-spring module to the rolling piston, wherein a plurality of guide ribs are arranged on the connecting element and the air-spring module bellows are arranged on a side facing the rolling piston on the connecting element, and the connecting element is arranged directly adjacent to the rolling piston at least in certain sections and the connecting element is placed onto the rolling piston.

19. The air spring for a vehicle according to claim 18, wherein the plurality of guide ribs are distributed on a circumference of an inner surface of the connecting element, and each of the plurality of guide ribs extend inwardly from the inner surface of the connecting element.

20. The air spring for a vehicle according to claim 18, wherein each of the plurality of guide ribs include a protrusion extending in an axial direction beyond an edge of the inner surface of the connecting element.

* * * * *